(12) United States Patent
Suzuki

(10) Patent No.: US 9,848,164 B2
(45) Date of Patent: Dec. 19, 2017

(54) SIGNAL TRANSMISSION METHOD AND ELECTRONIC DEVICE

(71) Applicant: Kabushiki Kaisha Toshiba, Tokyo (JP)

(72) Inventor: Nobuaki Suzuki, Akishima (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 217 days.

(21) Appl. No.: 14/470,725

(22) Filed: Aug. 27, 2014

(65) Prior Publication Data

US 2016/0065892 A1    Mar. 3, 2016

(30) Foreign Application Priority Data

Nov. 29, 2013    (JP) ................................ 2013-248152

(51) Int. Cl.
| | | |
|---|---|---|
| *G06F 13/10* | (2006.01) | |
| *H04N 7/12* | (2006.01) | |
| *H04N 7/015* | (2006.01) | |
| *G09G 5/00* | (2006.01) | |

(52) U.S. Cl.
CPC ................ *H04N 7/12* (2013.01); *G09G 5/00* (2013.01); *H04N 7/015* (2013.01)

(58) Field of Classification Search
None
See application file for complete search history.

(56) References Cited

U.S. PATENT DOCUMENTS

| | | | | |
|---|---|---|---|---|
| 2009/0138935 | A1* | 5/2009 | Ohkita | G09G 5/006 725/134 |
| 2011/0113442 | A1* | 5/2011 | Kikkawa | G09G 5/006 725/25 |
| 2011/0154425 | A1* | 6/2011 | Kim | H04N 21/2385 725/116 |
| 2014/0205024 | A1* | 7/2014 | Toba | H04N 19/85 375/240.28 |
| 2014/0293068 | A1* | 10/2014 | Tsuru | G09G 5/006 348/184 |

FOREIGN PATENT DOCUMENTS

| | | |
|---|---|---|
| JP | 2013-062562 | 4/2013 |
| JP | 2013-090113 | 5/2013 |
| JP | 2013-120204 | 6/2013 |

* cited by examiner

*Primary Examiner* — Ilwoo Park
(74) *Attorney, Agent, or Firm* — Rutan & Tucker, LLP

(57) ABSTRACT

According to one embodiment, an electronic device including a signal division module and a plurality of output ports. The signal division module receive an input signal and to divide the received input signal into a predetermined number of signals. The plurality of output ports being configured to output the predetermined number of signals into which the input signal is divided by the signal division module and information indicating physical addresses of themselves to a plurality of two-way communication interfaces a number of which corresponds to the predetermined number at the time of division by the signal division module.

9 Claims, 8 Drawing Sheets

| Packet Byte # | 7 | 6 | 5 | 4 | 3 | 2 | 1 | 0 |
|---|---|---|---|---|---|---|---|---|
| PB0 | Checksum ||||||||
| PB1 | 24-bit IEEE Registration Identifier (0xXXXX) (least significant byte first) ||||||||
| PB2 | ||||||||
| PB3 | ||||||||
| PB4 | Bit for capable of signal division function | | Rsvd (0) | Rsvd (0) | Rsvd (0) | Rsvd (0) | Rsvd (0) | Rsvd (0) |
| PB5 | Physical Address ||||||||
| PB6 | Division number ||||||||
| PB7 | Division mode ||||||||
| PB8 | Order information ||||||||

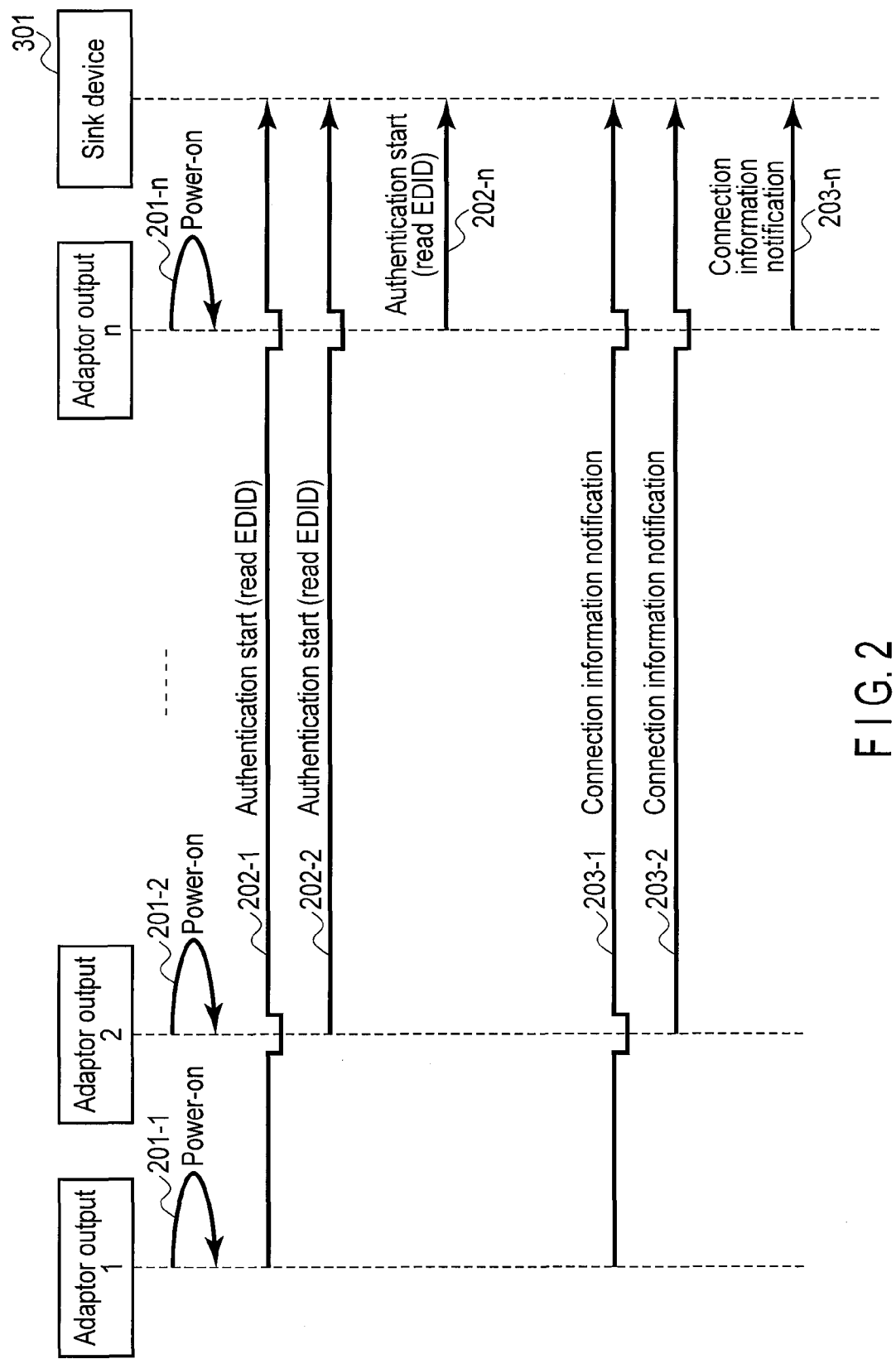
F I G. 2

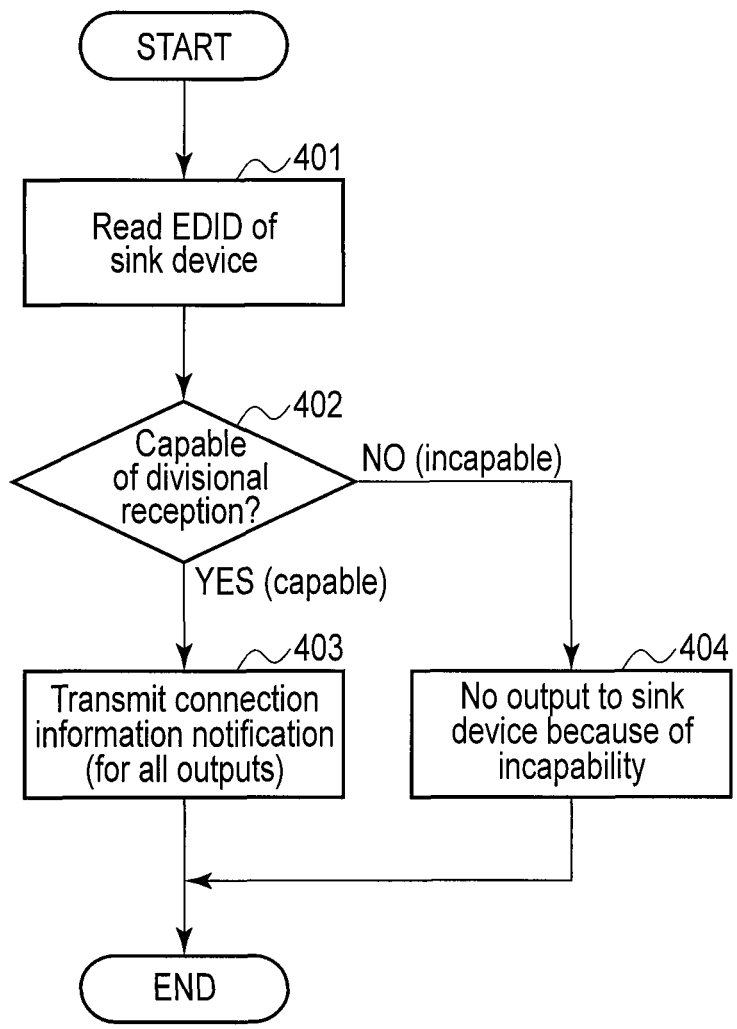
F I G. 3

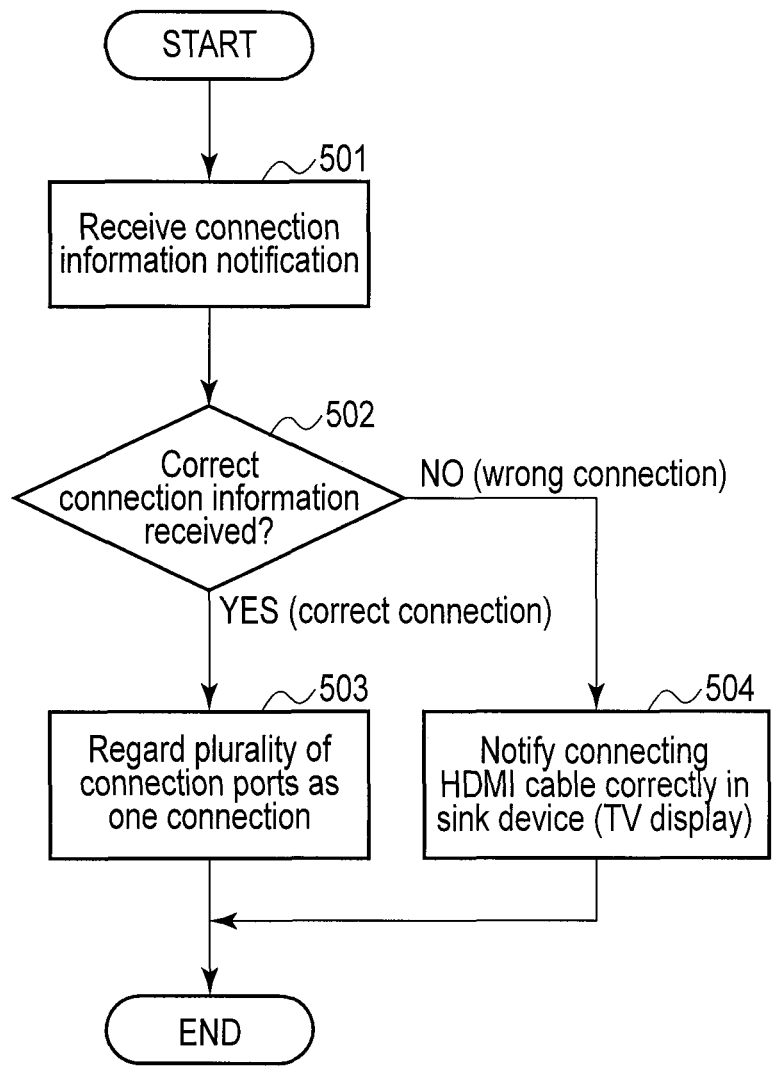
F I G. 4

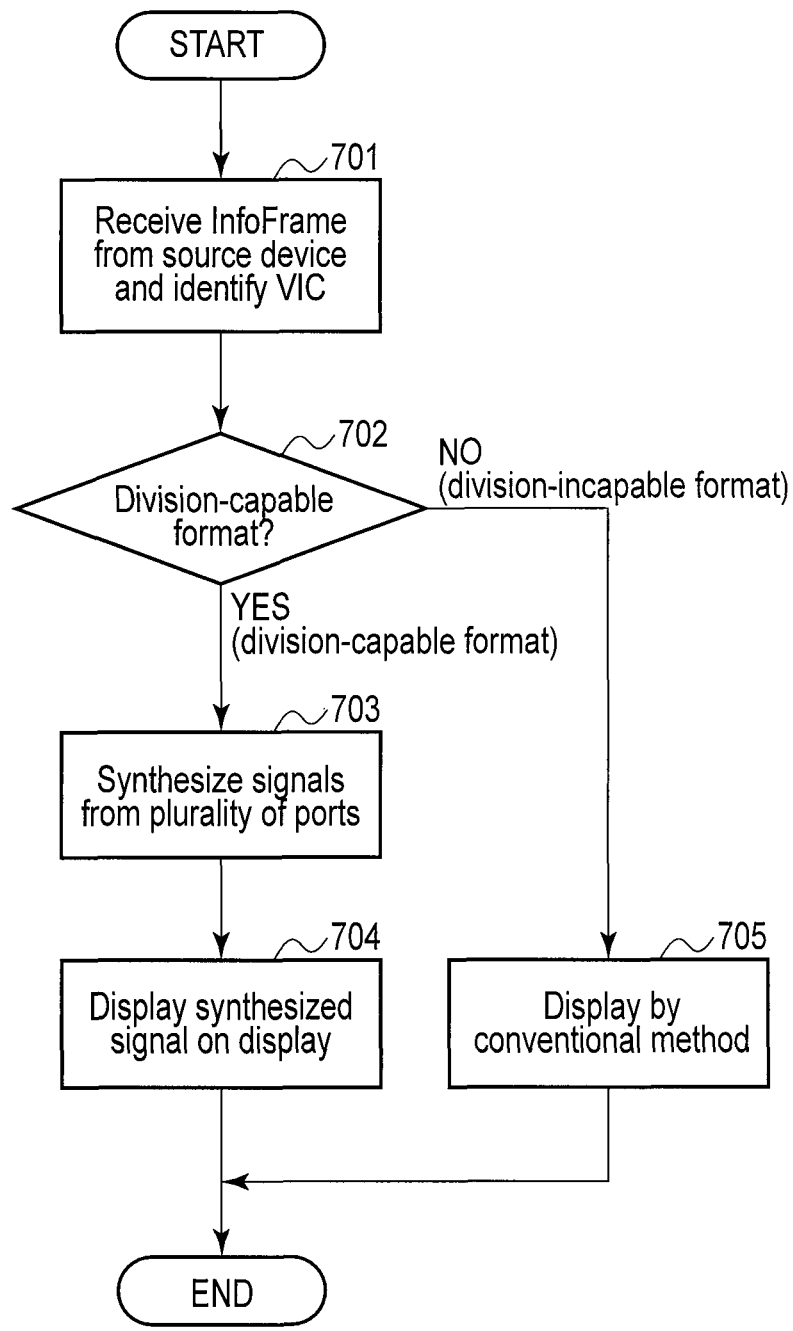
F I G. 6

| Byte # | 7 | 6 | 5 | 4 | 3 | 2 | 1 | 0 |
|---|---|---|---|---|---|---|---|---|
| 0 | Vendor-specific tag code (=3) | | | Length (=N) | | | | |
| 1 | 24-bit IEEE Registration Identifier (0xXXXX) (least significant byte first) | | | | | | | |
| 2 | | | | | | | | |
| 3 | | | | | | | | |
| 4 | Bit for capable of signal division function | Rsvd (0) | Rsvd (0) | Rsvd (0) | Rsvd (0) | Rsvd (0) | Rsvd (0) | Rsvd (0) |
| 5 | Type for Division-capable format | | | | | | | |
| 6 | The number of division-capable connectors | | | | | | | |
| 7 | VIC_1 | | | | | | | |
| 8 | VIC_2 | | | | | | | |
| 9 | VIC_3 | | | | | | | |
| 10 | VIC_4 | | | | | | | |
| 11 | VIC_5 | | | | | | | |
| 12 | VIC_6 | | | | | | | |
| N | Reserved | | | | | | | |

FIG. 7

| Packet Byte # | 7 | 6 | 5 | 4 | 3 | 2 | 1 | 0 |
|---|---|---|---|---|---|---|---|---|
| PB0 | Checksum ||||||||
| PB1 | 24-bit IEEE Registration Identifier (0xXXXX)<br>(least significant byte first) ||||||||
| PB2 | ||||||||
| PB3 | ||||||||
| PB4 | Bit for capable of signal division function | | Rsvd (0) | Rsvd (0) | Rsvd (0) | Rsvd (0) | Rsvd (0) | Rsvd (0) |
| PB5 | Physical Address ||||||||
| PB6 | Division number ||||||||
| PB7 | Division mode ||||||||
| PB8 | Order information ||||||||

F I G. 8

SIGNAL TRANSMISSION METHOD AND ELECTRONIC DEVICE

CROSS-REFERENCE TO RELATED APPLICATIONS

This application is based upon and claims the benefit of priority from Japanese Patent Application No. 2013-248152, filed Nov. 29, 2013, the entire contents of which are incorporated herein by reference.

FIELD

Embodiments described herein relate generally to a signal transmission method for transmitting video, audio and control signals, and an electronic device for realizing the signal transmission method.

BACKGROUND

As a method and standard for transmitting video, audio (voice) and control signals, the High-definition Digital Media Interface (HDMI) (Registered Trademark) standard and HDMI cables are widespread.

However, a band becomes insufficient for a video signal conforming to a new video standard which uses a signal of four times or sixteen times the band of current full-high-definition (1920×1080 pixels). On the other hand, although a dedicated transmission standard and dedicated transmission cables can be used, compatibility with the current HDMI standard and current transmission cables will be lost.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 shows an exemplary diagram showing an example of transfer of a signal between the signal division device and a sink device according to an embodiment;

FIG. 3 shows an exemplary diagram showing an example of operation at the time of activation of the signal division device according to an embodiment;

FIG. 4 shows an exemplary diagram showing an example of operation at the time of activation of the sink device according to an embodiment;

FIG. 6 shows an exemplary diagram showing an example of operation at the time of activation of the sink device according to an embodiment;

FIG. 7 shows an exemplary diagram showing an example of notation of EDID of the sink device according to an embodiment; and FIG. 8 shows an exemplary diagram showing an example of notation of a format corresponding to "InfoFrame" transmitted by the adaptor according to an embodiment.

DETAILED DESCRIPTION

Various embodiments will be described hereinafter with reference to the accompanying drawings.

In general, according to one embodiment, an electronic device comprising: a signal division module configured to receive an input signal and to divide the received input signal into a predetermined number of signals; and a plurality of output ports a number of which is equal to the predetermined number, the output ports being configured to output the predetermined number of signals into which the input signal is divided by the signal division module and information indicating physical addresses of themselves to a plurality of two-way communication interfaces a number of which corresponds to the predetermined number at the time of division by the signal division module.

Embodiments will now be described hereinafter in detail with reference to the accompanying drawings.

Figure 1:
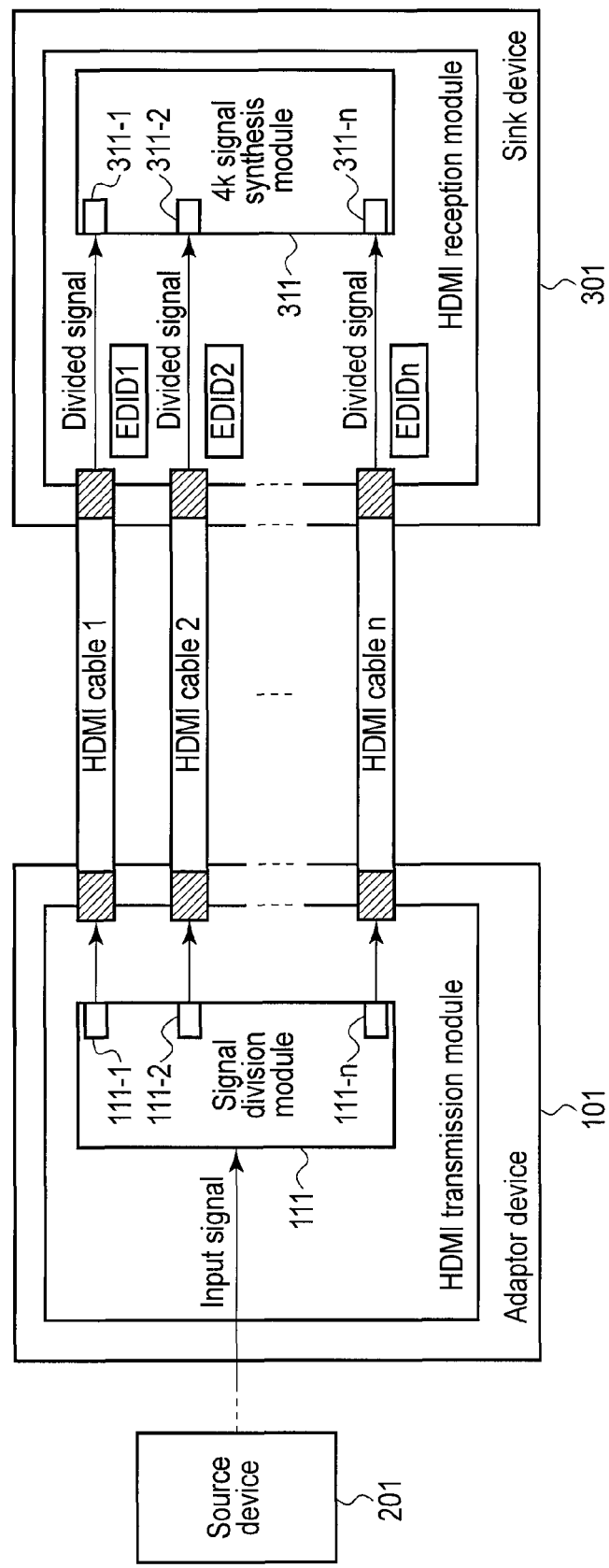
FIG. 1 shows an exemplary diagram showing an example of a signal division device (adaptor) according to an embodiment.

An electronic device (a signal transmission adaptor device; hereinafter, referred to as an adaptor) 101 shown in FIG. 1 comprises a signal division module 111 configured to divide an input signal (a video signal, an audio signal and a control signal) input from a source device 201 to the adaptor 101 into a predetermined number of signals. The signal division module 111 comprises a predetermined number of output ports 111-1, 111-2, . . . , 111-$n$ for outputting divided output to a sink device 301. To the output ports 111-1, 111-2, . . . , 111-$n$, a predetermined number of High-definition Digital Media Interface (HDMI, two-way communication interface) cables 1, 2, . . . , n (n is an integer) of the current standard (version 1.4b) are connectable. The HDMI cables 1, 2, . . . , n are configured to input (transmit) a predetermined number of divided signals from the signal division module (HDMI transmission module) 111 (adaptor 101) to a predetermined number of input ports 311-1, 311-2, . . . , 311-$n$ (n is an integer) of a signal synthesis module (HDMI reception module) 311 (sink device 301) which is configured to synthesize a predetermined number of received divided signals. A division number at the time of dividing an input signal will be described later. Video to be divided is, for example, a video signal conforming to a new video standard which uses a video signal of, for example, twice or four times the band of video of the current full-high-definition standard (1920×1080 pixels; 60 Hz frame rate [video frequency], hereinafter, expressed as "@60 Hz"). The number of pixels in a video signal of twice the band is four times greater (3840×2160 pixels) than that of the current full-high-definition, and it is referred to as 4 k video. Also, the number of pixels in a video signal of four times the band is sixteen times greater (7680×4320 pixels) than that of the same full-high-definition, and it is referred to as 8 k video.

The source device 201 is capable of processing a video signal conforming to a new video standard which uses a video signal of, for example, twice or four times the band of video of the current full-high-definition standard (1920× 1080@60 Hz), and is configured to output the video signal to the adaptor 101 through a dedicated transmission line/an output interface. A voice signal or an audio signal (audio) may be attached to a video signal. The information content (data size) of a voice signal or an audio signal is fewer (smaller) than that of a video signal. Thus, a current transfer standard as is can be used. As a matter of course, also for a voice signal or an audio signal, it is effective to use a transmission system whose band is improved in accordance with a required quality.

A dedicated transmission line is arbitrary, and thus a detailed explanation thereof is omitted. As the dedicated transmission line, for example, sixteen pairs or thirty-two pairs of parallel systems can be used.

By adopting a storage medium such as an SD extended capacity (SDXC) card and a communication interface such as ultra-high-speed (UHS) 104 (USH-I) as an output interface, a read (transfer) rate of about 100 MB/s can be obtained. Also, by adopting an interface conforming to the WiFi (wireless fidelity) standard conforming to the IEEE 802.11g/n, etc., as an output interface, a transfer (read) rate of about 300 MB/s can be realized at the maximum.

The source device 201 is, for example, an imaging device (video camera), a graphical system (computer for image output), a card reader (SDXC card reader), a reception device (set-top box [STB]) capable of receiving a video signal of 4 k (8 k) video.

The adaptor 101 is configured to supply (transmit) 4 k or 8 k video divided by a predetermined number (the transmittable smallest division number) by the signal division module 111 to the signal synthesis module 311 of the sink device 301 through the predetermined number (the transmittable smallest division number) of HDMI cables 1, 2, . . . , n which connect to the output ports 111-1, 111-2, . . . , 111-n (n is an integer) corresponding to the division number. If the HDMI cables 1, 2, . . . , n are, for example, of version 1.4b, the greatest frame rate of a video signal transmittable per cable is 60 Hz (@60 Hz) in a video signal (1920×1080 pixels) of the current full-high-definition standard. Thus, for example, for 3D video of the equal number of pixels, the frame rate is limited to 30 Hz (@30 Hz) or "I" [interlaced] (a 3D video signal of the full-high-definition standard cannot be transmitted through an HDMI cable of version 1.4b, because its frame rate is @60 Hz). This limitation is applied also to 4 k video (3840×2160 pixels) and 8 k video (7680×4320 pixels) whose video frequencies are 60 Hz. Thus, in the signal division module 111, an input signal (a video signal, an audio signal and a control signal) is divided into a predetermined number (the transmittable smallest division number) of signals to fall within a band up to 4 k@30 Hz compatible with the HDMI 1.4b.

For example, if the input signal is 4 k video (3840×2160@60 Hz), the signal division module 111 divides it into, for example, two 3840×2160@30 Hz sets. If the input signal is 8 k video (7680×4320@60 Hz), the signal division module 111 divides it into, for example, four 3840×2160@30 Hz sets. It suffices that the division number falls within the range of the transmittable smallest division number, and for example, 4 k video (3840×2160@60 Hz) may be divided into, for example, four 1920×1080@30 Hz sets.

The signal division module 111 also functions as a transmission module configured to transmit a predetermined number of signals into which an input signal is divided to the sink device 301 through a predetermined number of HDMI cables conforming to the current HDMI 1.4b standard which connect to the individual output ports (of the signal division module 111).

The sink device 301 is, for example, a monitor device or a television broadcast reception and reproduction device (hereinafter, referred to as a television device) configured to reproduce (display) video based on a video signal conforming to a new video standard which uses a signal of about twice or four times the band of video of the current full-high-definition (1920×1080 pixels) standard, and is capable of displaying (reproducing), for example, 4 k video (3840×2160 pixels) and 8 k video (7680×4320 pixels).

The sink device 301 is configured to synthesize video signals received by the arbitrary number of input ports 311-1, 311-2, . . . , 311-n in the signal synthesis module 311. That is, the signal synthesis module 311 functions as a reception module configured to receive a predetermined number of video signals (transmitted by the adaptor 101) supplied from the adaptor 101 through the predetermined number of HDMI cables conforming to the current HDMI 1.4b standard which connect to the respective output ports of the signal division module 111 (adaptor 101). Thus, the signal synthesis module 311 is capable of receiving, synthesizing and displaying (reproducing), for example, 4 k video or 8 k video from the source device 201 by parallel use of the plurality of HDMI cables 1, 2, . . . , n of the current standard. Extended display identification data (EDID)-1, -2, . . . , -n (n is an integer) are attached to the input ports 311-1, 311-2, . . . , 311-n, respectively.

FIG. 2 shows a sequence at the time of activation (at the time of power-on) of the adaptor.

When the adaptor 101 (and the sink device 301) is activated (201 [201-1, 201-2, . . . , 201-n]), the adaptor 101 starts authentication of the sink device 301 through the respective output ports 111-1, 111-2, . . . , 111-n and the connected HDMI cables 1, 2, . . . , n. That is, for example, by referring to EDID-1, -2, . . . , -n as shown in FIG. 7, it is confirmed that the sink device comprises the signal synthesis module 311 (function of synthesizing HDMI signals). More specifically, the adaptor 101 is configured to read the EDID (-1, -2, . . . , -n) of the respective input ports 311-1, 311-2, . . . , 311-n of the sink device 301, and to confirm that the sink device 301 has a function of synthesizing a predetermined number of input signals into which a video signal (input signal) is divided (202 [202-1, 202-2, . . . , 202-n]).

If it is confirmed that the sink device 301 has the function of synthesizing input signals into which a video signal is divided, the adaptor 101 transmits information on the division method and the transmission order of the divided video signal, or the like, such as "connection information notification" to the sink device 301, and converts the signal synthesis module 311 of the sink device 301 into a standby state where divisional transmission can be carried out (203 [203-1, 203-2, . . . , 203-n]). The "connection information notification", an example of which is shown in FIG. 8, can also be realized by, for example, using a vendor-specific code.

The "connection information notification" is, for example, the following:
the physical address assigned to an HDMI output port;
the division number of the video signal (information content [size] per division);
the division mode of the video signal; and
the transmission order (order information).

Also, as the division number (division mode) of the video signal, the following can be realized:
division in units of frame rate (video frequency);
division vertically;
division horizontally;
division vertically and horizontally, respectively;
division per line (or pixel); or the like.

With respect to the division number, as described above, it suffices that in the signal division module 111, an input signal (a video signal, an audio signal and a control signal) is divided into a predetermined number (the transmittable smallest division number) of signals to fall within a band up to 4 k@30 Hz compatible with the HDMI 1.4b. For example, in order to transmit 4 k video (3840×2160@60 Hz) by an HDMI cable conforming to the current HDMI 1.4b, the division number is two.

The above-described connection notification information is supplied to the sink device 301 as "InfoFrame", which will be explained in detail later by FIG. 8. The "InfoFrame" is output from each of the output ports of the signal division module 111, and thus includes the physical address of divided HDMI output for each output.

FIG. 3 shows an example (flowchart) of operation at the time of power-on (activation) of the adaptor which operates in the sequence shown in FIG. 2.

Following power-on of the individual output ports (1 to n) of the adaptor 101, the EDID of EDID (-1, -2, . . . , -n) of the individual input ports 311-1, 311-2, . . . , 311-n of the sink device 301 are read. That is, it is confirmed that the sink device 301 has the function of synthesizing a predetermined number of input signals into which a video signal (input signal) is divided [401].

Next, it is detected whether (the sink device 301) is capable of divisional reception (whether it is capable of divisional reception or not) [402].

If it is detected that the sink device 301 is capable of divisional reception, [402—YES <capable>], a connection information notification is transmitted at all the output ports [403].

If it is detected that the sink device 301 is not capable (incapable) of divisional reception [402—NO <incapable>], divisional transmission is cancelled. At the time of cancellation of divisional transmission, it is also possible to cause the sink device 301 to display a message (alert) for the device incapable of divisional reception, for example, "divisional transmission cannot be carried out".

FIG. 4 shows an example (flowchart) of operation at the time of power-on (activation) of the sink device 301.

The sink device 301 (signal synthesis module 311) receives a connection information notification from each of the output ports of the adaptor 101 [501].

On the basis of the received connection information notification, the sink device detects whether correct connection information is received (whether connection information is correctly received or not) [502].

If correct connection information is received [502—YES <correct connection>], in the signal synthesis module 311, a plurality of connection ports are regarded as one connection and divisional transmission from the adaptor 101 is received [503].

If a connection information notification is received from the adaptor 101 in an unintended connection structure such as those in which a connection terminal is different, it is proposed in a display device (display module of the sink device 301) that the individual cables be connected correctly. Whether a connection terminal is different can be identified by, for example, exchanging the physical addresses of the respective ports between the adaptor and the sink device (television device). That is, by receiving "InfoFrame" of a format defined in FIG. 8 at each port from the adaptor (source device) 101, a physical address of an output port output from the adaptor device is determined. The "InfoFrame" includes also order information which will be explained later. Thus, whether the individual HDMI cables are correctly connected to the respective ports of the signal synthesis module 311 of the sink device (television device) (connection is correct) or not can be detected in the sink device (television device) on the basis of received "InfoFrame" and a physical address of an output port on a transmission side which can be identified based on the "InfoFrame". Thereby, for example, if it is detected that a connection terminal is different (connection error of an HDMI cable), it can be proposed to a user that an HDMI cable be connected correctly [504]. That is, for example, in the case of transmission with four cables, it is assumed that the sink device 301 is configured to receive a stream from the port 111-1 of the adaptor 101 at the port 311-1, to receive a stream from the port 111-2 at the port 111-3, and to receive a stream from the port 111-4 at the port 311-4. Here, if the sink device 301 receives a stream including InfoFrame including any address of the ports 111-1, 2, 3, 4, at a port other than the four ports (for example, port 311-5), it determines that a cable is connected to a wrong port. Also, if an address received at each port includes an address of different hierarchy (address whose place of a number other than zero is different), the sink device 301 may determine that a connection relationship of cables is wrong. That is, for example, if the sink device 301 receives the address of (1.0.0.0) at the port 311-1, the address of (2.0.0.0) at the port 311-2, the address of (3.0.0.0) at the port 311-3, and the address of (4.1.0.0) at the port 311-4, it can be recognized that the adaptor device 101 is connected to the ports 311-1, 2 and 3 without a relay, and is connected to the port 311-4 through a relay. If the adaptor device 101 is connected through a relay, a transmission delay may be caused by the relay. Thus, if a hierarchy indicated by an address received at a certain port is different from that of an address received at another port, the sink device 301 may propose a notification indicating that a relay is connected to the certain port. In addition, even in the case of receiving streams from the ports 111-1, 2, 3 and 4 of the adaptor device 100 at the ports 311-1, 2, 3 and 4, for example, if a stream from the port 111-3 is received at the port 311-4, the sink device 301 may determine and notify a wrong cable connection. However, if a stream from the port 111-3 is received at the port 311-4, the sink device 301 may exchange and combine the stream with video received at another port on the basis of order information included in the stream. In this case, a notification is unnecessary.

Figure 5:
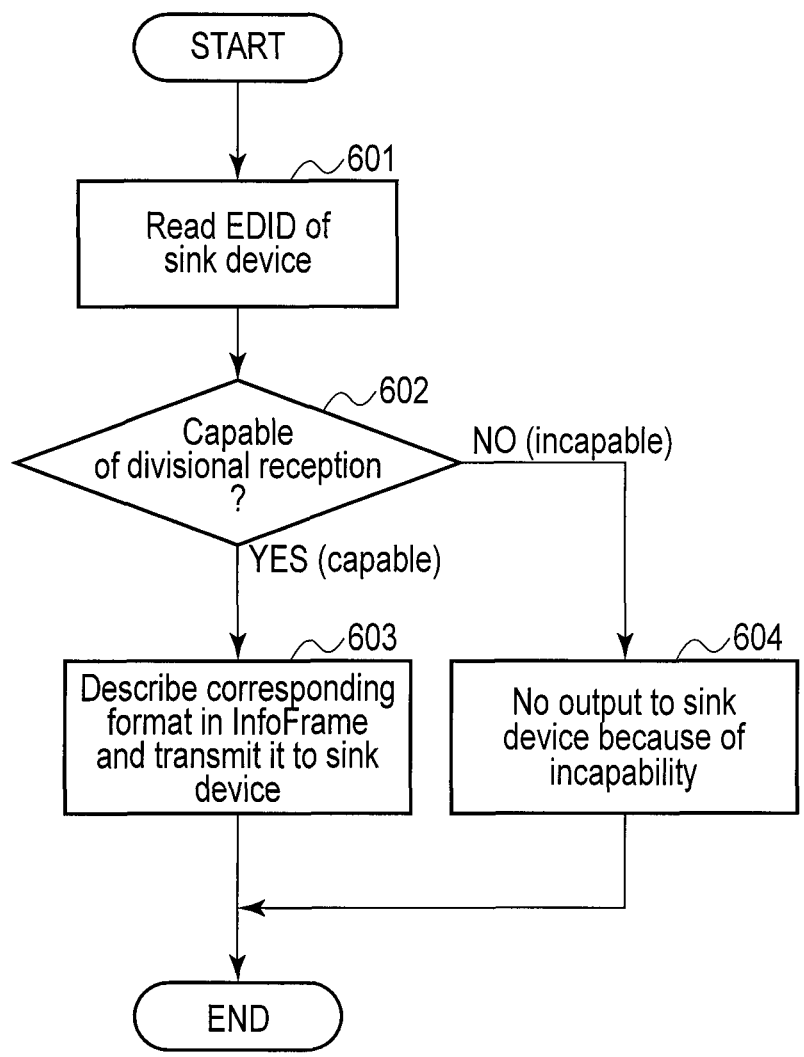
FIG. 5 shows an exemplary diagram showing an example of operation at the time of activation of the signal division device according to an embodiment.

In FIG. 5 to FIG. 8, a mode of transmitting pixel information of a 4 k2 k@60 Hz Y/Cb/Cr 8-bit (4:1:1) video format by distributing it to HDMI transmission 8-bit 3-channel of 297 MHz is explained as a "signal division function". FIG. 5 shows an example (flowchart) of operation at the time of power-on (activation) of the adaptor, and FIG. 6 shows an example (flowchart) of operation at the time of power-on (activation) of the sink device, respectively. FIG. 7 shows an example of notation of EDID of the sink device 301, and FIG. 8 shows an example of a format corresponding to "InfoFrame" transmitted from the adaptor, respectively.

As shown in FIG. 5, following power-on of the individual output ports (1 to n) of the adaptor 101, the EDID of EDID (-1, -2, . . . , -n) of the individual input ports 311-1, 311-2, . . . , 311-n of the sink device 301 are read. That is, it is confirmed that the sink device 301 has a function of synthesizing a predetermined number of input signals into which a video signal (input signal) is divided [601].

Next, it is detected whether (the sink device 301) is capable of divisional reception (whether it is capable of divisional reception or not) [602].

If it is detected that the sink device 301 is capable of divisional reception [602—YES <capable>], a corresponding format is described in "InfoFrame" which is to be transmitted to the sink device 301, and is transmitted to the sink device 301 [603]. The "InfoFrame" is output from each output port. Also, the "InfoFrame" is data inserted in, for example, a horizontal blanking area or a vertical blanking area in a video stream.

If it is detected that the sink device 301 is not capable (incapable) of divisional reception [602—NO <incapable>], divisional transmission is cancelled. At the time of cancellation of divisional transmission, it is also possible to cause the sink device 301 to display a message (alert) for the device incapable of divisional reception, for example, "divisional transmission cannot be carried out".

FIG. 6 shows an example (flowchart) of operation at the time of power-on (activation) of the sink device 301. The sink device 301 (signal synthesis module 311) receives "InfoFrame" of a format defined in FIG. 8 at each port from the adaptor (source device) 101, and identifies a video information code (VIC) format (video format) of a video signal transmitted by the adaptor [701].

The sink device detects whether a video format indicated by received "InfoFrame" is a division-capable format (whether or not it is indicated that the format is a division-capable format) [702].

If it is detected that it is a division-capable format [702—YES <division format>], respective signals received from a plurality of ports are synthesized in the signal synthesis module 311 [703].

If it is detected that it is not a division-capable format [702—NO<division-incapable format>], display is carried out by a conventional method [704].

FIG. 7 shows an example of notation of EDID of the sink device 301. For example, an indication of a vendor-specific code (in the 0-order row), Bit for "Capable of signal division function" in the 4th row, Type for "Division-capable format" in the 5th row, "The number of division-capable connectors" in the 6th row, "video information code (VIC) format information" from the 7th row downward, and the like are prepared, and thus, it can be determined in the adaptor 101 whether signals into which a video signal is divided can be received in the sink device 301.

FIG. 8 shows an example of a format corresponding to "InfoFrame" transmitted from each port by the adaptor. For example, Bit for "Capable of signal division function" in the 5th row (PB4), "Physical address" in the 6th row (PB5), "Division number" in the 7th row (PB6), "Division mode" in the 8th row (PB7) and "Order information (the transmission order)" in the 9th row (PB8), displayed as packet byte rows, are prepared, and thus signals into which a video signal is divided in accordance with a rule indicated by a format can be transmitted to the sink device 301.

The "Physical address" indicates the physical address of an HDMI assigned to each output port.

The order information includes the transmission order of transmitting "InfoFrame" output by each output port. Each "InfoFrame" is transmitted from each output port, and thus the transmission order is associated with the physical address of an output port.

The order information notifies the sink device of: for example, the transmission order of a "top" image and a "bottom" image in the case where the division number is "2" and the division mode is "top and bottom (vertical direction)"; the transmission order of a "left" image and a "right" image in the case where the division number is "2" and the division mode is "left and right (horizontal direction)"; and the transmission order of a "top" image, a "bottom" image, a "left" image and a "right" image in the case where the division number is "4" and the division mode is "top, bottom, left and right (both a vertical direction and a horizontal direction)".

Thereby, in the sink device, if individual HDMI outputs are received in the order different from the division mode, for example, a connection error of an HDMI cable can be detected.

Thus, in the adaptor to which the embodiment is applied, an input signal (a video signal, an audio signal and a control signal) is divided into a predetermined number (the transmittable smallest division number) of signals so as to fall within a band up to 4 k@30 Hz compatible with the HDMI 1.4b, and thus can be transmitted to the sink device. That is, a video signal, an audio signal and a control signal having a greater information content can be transmitted more rapidly according to a current standard and by means of a current transmission cable for transmitting video, audio and control signals without using a dedicated transmission standard and a dedicated transmission cable.

In the above-described embodiment, connection information notification is carried out by using InfoFrame. However, the source device 101 may carry out connection information notification by transmitting, from each port, a CEC message including the physical address of the port, a division number of a video signal (information content [size] per division), a division mode of a video signal, and a transmission order (order information).

In addition, although an example of dividing a video signal of 4 k2 k (3840×2160 pixels)@60 Hz has been described, a video signal of a different format of 8 k4 k, etc., can also be transmitted similarly. In an adaptor, by dividing an input signal (a video signal, an audio signal and a control signal) to make it fall within a band up to 4 k@30 Hz, for example, a video signal of two sets of 4 k2 k (3840×2160 pixels)@60 Hz can also be transmitted by using four sets of HDMI cables conforming to the current HDMI 1.4b. Thus, for example, assuming a video signal of 8 k4 k, if eight sets of cables conforming the HDMI 1.4b can be installed, a video signal of four sets of 4 k2 k (3840×2160 pixels)@60 Hz can also be transmitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic apparatus comprising:
a receiver configured to receive a single video stream of 4k video or 8k video;
a first output port having a first physical address and configured to receive first Extended Display Identification Data (EDID) of a first input port of a first electronic apparatus via a first HDMI cable;
a second output port having a second physical address and configured to receive second Extended Display Identification Data (EDID) of a second input port of the first electronic apparatus via a second HDMI cable;
a transmitter configured to transmit first information regarding a division scheme of the single video stream to the first electronic apparatus, and transmit second information regarding the first physical address and the second physical address to the first electronic apparatus; and
control circuitry configured to:
determine a number of output ports used to transmit the single video stream to the first electronic apparatus according to a rate of the single video stream; and
divide the single video stream into at least a first divided video signal and a second divided video signal according to the first EDID and the second EDID, wherein the first output port is further configured to transmit the first divided video signal to the first input port and the second output port is further configured to transmit the second divided video signal to the second input port, the first divided video signal and the second divided video signal are to be merged to reproduce the single video stream by the first electronic apparatus;

the first information and the second information are to be used to detect an error in connection between the first and second output ports of the electronic apparatus and the first and second input ports of the first electronic apparatus via the first HDMI cable and the second HDMI cable by the first electronic apparatus, and the error is notified to a user by the first electronic apparatus.

2. The electronic apparatus of claim 1, wherein the division scheme includes information content per division and a division mode of the first video signal.

3. The electronic apparatus of claim 2, wherein the single video stream is to be displayed on a screen of the first electronic apparatus.

4. The electronic apparatus of claim 1, wherein the division scheme at least includes information about division in units of frame rate or video frequency, and/or direction for division.

5. An electronic apparatus comprising:
a first input port having a first physical address and configured to receive a first divided video signal from a first output port of a first electronic apparatus via a first HDMI cable, wherein the first divided video signal is divided according to first Extended Display Identification Data (EDID) of the first input port;
a second input port having a second physical address and configured to receive a second divided video signal from a second output port of the first electronic apparatus via a second HDMI cable, wherein the second divided video signal is divided according to second Extended Display Identification Data (EDID) of the second input port;
a receiver configured to receive first information regarding a division scheme of a single video stream of 4k video or 8k video from the first electronic apparatus, and receive second information regarding the first physical address and the second physical address from the first electronic apparatus; and
control circuitry configured to merge at least the first divided video signal and the second divided video signal into the single video stream; and
a screen configured to display the video image of the single video stream,
wherein the first divided video signal and the second divided video signal are to be merged to reproduce the single video stream,
the first information and the second information are to be used to detect an error in connection between the first and second output ports of the first electronic apparatus and the first and second input ports of the electronic apparatus via the first HDMI cable and the second HDMI cable, and
the error is notified to a user on the screen.

6. The electronic apparatus of claim 5, wherein the division scheme includes information content per division and a division mode of the first video signal.

7. The electronic apparatus of claim 6, wherein at least the first divided video signal and the second divided video signal are generated by dividing the single video stream, and the single video stream may be displayed on the screen.

8. A method of transmitting single video stream comprising:
receiving a single video stream of 4k or 8k video;
receiving, via a first output port of an electronic apparatus, first Extended Display Identification Data (EDID) of a first input port and a first physical address of a first electronic apparatus with a first HDMI cable;
receiving, via a second output port of the electronic apparatus, second Extended Display Identification Data (EDID) of a second input port and a second physical address of the first electronic apparatus with a second HDMI cable;
dividing the single video stream into at least a first divided video signal and a second divided video signal according to the first EDID and the second EDID;
transmitting first information regarding a division scheme of the single video stream to the first electronic apparatus;
transmitting second information regarding the first physical address and the second physical address to the first electronic apparatus;
detecting an error in connection between the first and second output ports of the electronic apparatus and the first and second input ports of the first electronic apparatus via the first HDMI cable and the second HDMI cable by the first electronic apparatus; and
notifying the error to a user by the first electronic apparatus.

9. A method of receiving single video stream comprising:
receiving, via a first input port, a first divided video signal from a first output port of a first electronic apparatus with a first HDMI cable, wherein the first divided video signal is divided according to a first Extended Display Identification Data (EDID) of the first input port;
receiving, via a second input port, a second divided video signal from a second output port of the first electronic apparatus with a second HDMI cable, wherein the second divided video signal is divided according to a second EDID of the second input port;
receiving first information regarding a division scheme of a single video stream of 4K video or 8k video from the first electronic apparatus;
receiving second information regarding a first physical address and a second physical address from the first electronic apparatus
detecting an error in connection between the first and second output ports of the first electronic apparatus and the first and second input ports of the electronic apparatus via the first HDMI cable and the second HDMI cable; and
notifying the error to a user on a screen.

* * * * *